(12) United States Patent
Nakatani

(10) Patent No.: US 6,373,514 B1
(45) Date of Patent: Apr. 16, 2002

(54) METHOD OF TESTING LIGHT EMISSION CONDITION OF EXPOSING HEAD AND DOT PATTERN FOR USE IN THE METHOD

(75) Inventor: Yoshiyuki Nakatani, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 09/499,211

(22) Filed: Feb. 7, 2000

(30) Foreign Application Priority Data

Feb. 10, 1999 (JP) .......................................... 11-032777

(51) Int. Cl.⁷ ................................................. B41J 2/47
(52) U.S. Cl. ....................................... 347/240; 347/251
(58) Field of Search .......................... 347/19, 183, 188, 347/240, 251; 382/165, 168, 190, 317; 358/518, 298

(56) References Cited

U.S. PATENT DOCUMENTS

| | | | |
|---|---|---|---|
| 4,115,806 A | * 9/1978 | Morton ........................ | 382/317 |
| 4,757,327 A | 7/1988 | Henzi .......................... | 347/237 |
| 5,416,613 A | * 5/1995 | Rolleston et al. ........... | 358/518 |
| 5,881,166 A | * 3/1999 | Farrell ........................ | 382/168 |
| 6,034,711 A | * 3/2000 | Trask et al. ................. | 347/240 |

FOREIGN PATENT DOCUMENTS

| | | |
|---|---|---|
| EP | 0434449 | 6/1991 |
| EP | 0529532 | 3/1993 |
| WO | 9835834 | 8/1998 |

OTHER PUBLICATIONS

Shimizu, et al. "Color Vacuum Fluorescent printhead . . . System". vol. 23, May 17, 1992 (pp. 741–744).

* cited by examiner

*Primary Examiner*—Hai Pham
(74) *Attorney, Agent, or Firm*—Fulbright & Jaworksi, LLP (57) ABSTRACT

A method is disclosed for testing a light emission condition of an exposing head of a type including a plurality of luminous elements arranged along a main scanning direction for forming a linear dot pattern on a print paper. The exposing head is movable relative to the print paper in a sub scanning direction. The emission amounts of the respective luminous elements are compared to each other, based on the densities of respective dots obtained by exposure on the print paper. For allowing more accurate grasping of the light emission of each luminous element, testing target dots are formed by driving luminous elements selected as target elements which are not adjacent each other in the main scanning direction. Further, background dots are formed in the peripheries of the target dots so that the peripheries are completely filled with the background dots having a density higher than that of the target dots.

8 Claims, 9 Drawing Sheets

SCANNING DIRECTION BY SCANNER 80

PRIOR ART

FIG.15

PRIOR ART

METHOD OF TESTING LIGHT EMISSION CONDITION OF EXPOSING HEAD AND DOT PATTERN FOR USE IN THE METHOD

BACKGROUND OF THE INVENTION

1. Field of the Invention

The present invention relates to a method of testing a light emission condition of an exposing head. The invention relates, more particularly, to a method for use with a type of exposing head which includes a plurality of luminous elements disposed along a main scanning direction for forming dots in the form of a dot-line on a print paper and which is movable in a sub scanning direction relative to the print paper, the method including the step of comparing light emission amounts of the luminous elements to each other based on the densities of the respective dots obtained by exposure of the print paper.

2. Description of the Related Art

Figure 14:
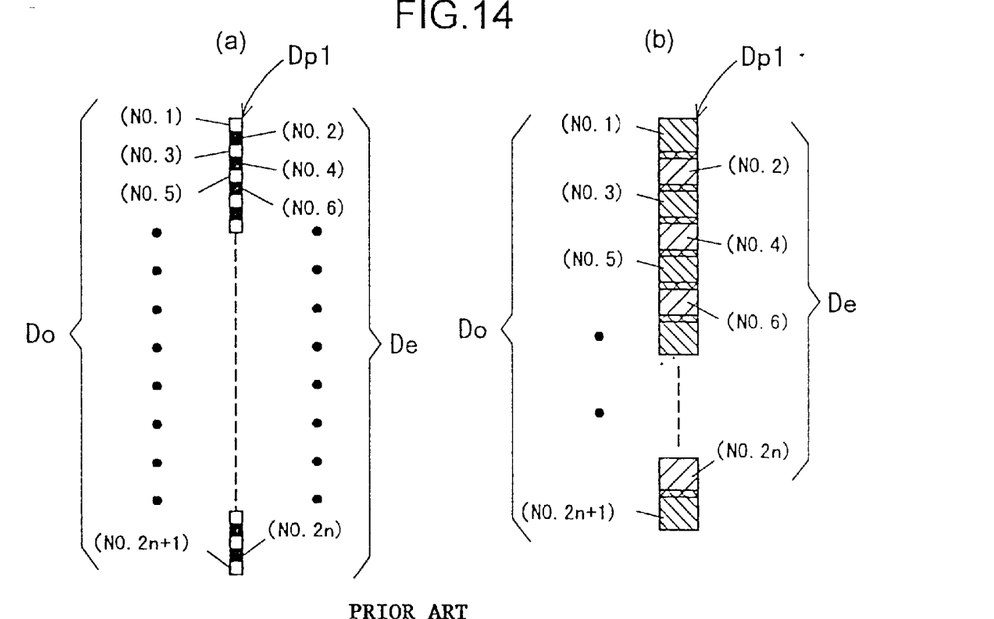
FIG. 14 is an explanatory view showing a testing dot pattern according to prior art, and FIG. 15 this an explanatory view showing a further testing dot pattern according to further prior art.

As an example of the method described above, the following method is known. In this known method, by driving the luminous elements of the exposing head under a predetermined load condition over a print paper, there is formed, on the print paper, a testing dot pattern in the form of a dot-line, more particularly, as shown in FIG. 14a, a dot pattern Dp1 including a plurality of dots adjacently aligned along the main scanning direction of the exposing head. Then, by applying a scanner along this linear dot pattern thus formed on the print paper (actually, the developed image of the dot-line which is obtained by first forming the latent image of the dot pattern Dp1 on the print paper and then developing the image thereon), the densities of the respective dots are obtained, and the obtained density values, or any irregularities among them, are outputted as the testing result of the light emission condition of the exposing head However, if the above test is conducted under such load condition as allowing the luminous elements to provide their full light emission performance, there occurs the tendency that in the dots formed on the print paper by the respective elements, one dot tends to extend into the adjacent area of another dot adjacent thereto. As a result, as shown in FIG. 14b which shows the principal portion of FIG. 14-a in an enlarged scale, there occurs overlapping between adjacent dots at their outermost portions. For this reason, in the step of determining the density of each individual dot by means of the scanner, the light emission condition of each luminous element cannot always be grasped with accuracy as each dot being influenced by its adjacent dot.

Figure 15:
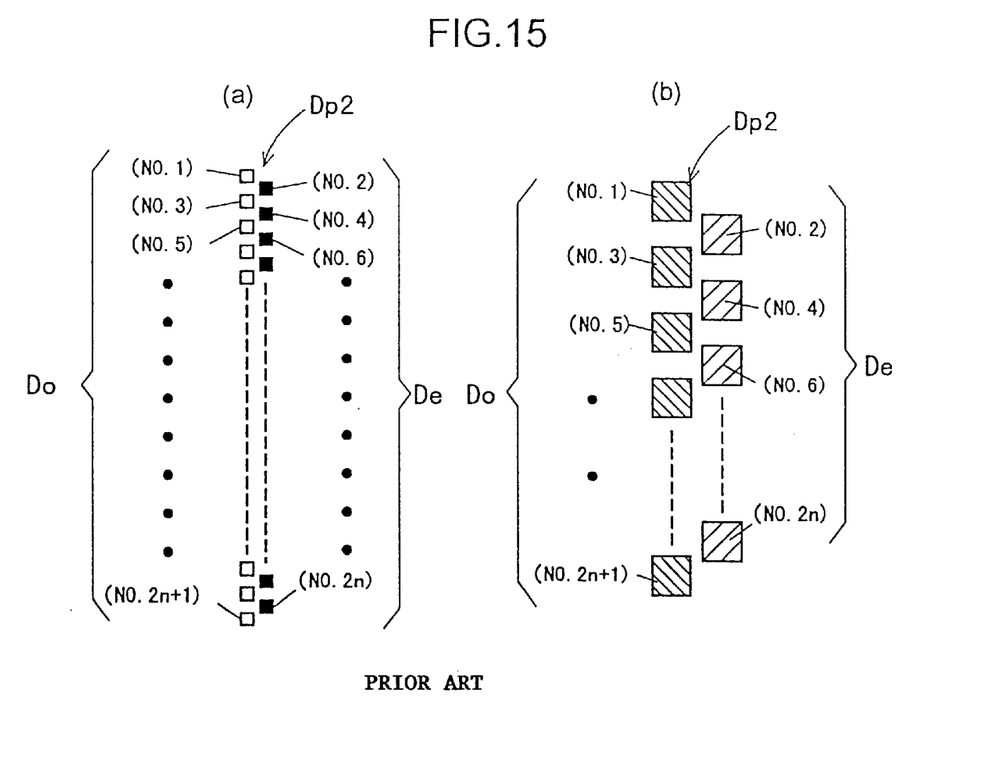

Then, as an improved method of testing a light emission condition of an exposing head devised to overcome the above problem, there is also known a method disclosed in the European patent published gazette EPO 925 941 (corresponding to the U.S. patent application Ser. No. 09/217,179) in the name of the same applicant as the present application. For overcoming the above problem, in this modified method, as shown in FIG. 15a and also in FIG. 15b which is an enlarged view, the method includes a first step of exposing and forming a plurality of arrays of dots (i.e. a plurality of "dot-lines") on the print paper, each array including a plurality of dots equidistantly spaced from each other in the main scanning direction and also the dot arrays are spaced from each other in the sub scanning direction which is perpendicular to the main scanning direction and a second step of determining the densities of the respective dots of the resultant dot pattern Dp2 one array after another by means of a scanner.

According to the above method, the dots within each array are spaced from each other in the main scanning direction. Hence, there occurs no overlap between the dots, so that the density of each dot may be determined without influence from the adjacent dot. Further, as the dot arrays are also spaced from each other in the sub scanning direction, the scanning operation by the line scanner may be effected in a plurality of steps separately for the respective arrays. And, with these plurality of scanning operations combined, the densities of all dots may be obtained. Consequently, the intended object of accurate grasping of the light emission condition of the individual luminous element may be achieved with ease. Further, if the exposing head consists of blocks provided separately for the respective color components of R (red), G (green) and B (blue), by effecting the above-described process for each of these blocks, the light emission conditions of all of the elements used in the exposing head may be tested.

With the above method proposed by the co-pending patent applications identified above, the print page remains completely 'blank', after its exposure, at those inter-dot areas thereof between each pair of dots spaced apart from each other. Therefore, in the second step, namely, the step of determining the densities of the respective dots of each array by using a scanner, such blank areas will affect the measurement values, thus hindering accurate testing (more particularly, this seems to be attributable to a phenomenon that a portion of the irradiating beam emitted from the optical reflection type scanner employed in the second step is reflected by the blank area to be 'flared' into the area of the dot which is the target dot of measurement, thus leading to inadvertent reduction in the measured density value.).

SUMMARY OF THE INVENTION

In view of the above-described drawbacks of the prior art described at the onset as well as the modified method of the invention described in the preceding patent applications, a primary object of the present invention is to provide a method of testing a light emission condition of an exposing head, which method is capable of overcoming such drawbacks of the prior art and achieving the original purpose of accurate grasping of the light emission condition of each luminous element of the exposing head.

For fulfiling the above-noted object, according to one aspect of the present invention, there is proposed a method of testing a light emission condition of an exposing head, which comprises the following:

(1) a first step of forming latent images of testing target dots on a print paper by driving luminous elements selected as target elements which are not adjacent each other in the main scanning direction;

(2) a second step of forming latent images of background dots in the peripheries of the latent images of the target dots so that the peripheries are completely filled with the latent images of the background dots with a density above a predetermined value;

(3) a third step of developing the latent images of the target dots and the background dots formed on the print paper and subsequently determining the densities of the respective developed images of the target dots by using a scanner; and (4) a fourth step of outputting the density of each one of the target dots obtained by the third step as a light emission amount of each corresponding luminous element selected as one of the target elements.

According to the invention's method of testing a light emission condition of an exposing head having the above construction, in the first step, there are obtained latent images of target dots which are not adjacent each other in the main scanning direction; and in the third step there are determined the densities of the developed images of these target dots without mutual overlaps therebetween. Hence, the density of the individual dot may be determined with accuracy, without influence from the adjacent dots. Moreover, in the density determination of the third step, this determination is made with the periphery of each target dot being filled with the images of the background dots without leaving any blanks therein. Therefore, this method is free from the disturbance due to the 'flaring' of the irradiating beam emitted from the optical reflecting scanner. Consequently, the light emission condition of each luminous element may be readily grasped with accuracy.

Preferably, the first step includes following sub steps:

(1-1) a first sub step of forming a latent image of a first dot array by driving at one time those luminous elements of the exposing head assigned for odd-numbered pixels; and (1-2) a second sub step of forming a latent image of a second dot array by driving at one time further luminous elements of the exposing head assigned for even-numbered pixels at a position spaced from the latent image of the first dot array in the sub scanning direction.

With this construction, the dots by all of the luminous elements required for formation of a linear testing dot pattern may be formed with just two times of exposure operation. As a result, the method of a light emission condition of an exposing head may be carried out more efficiently.

Preferably, the density of the background dot is set to be 50 to 60% of that of the target dot. With this setting, the flaring interference by the scanner beam with the density determination may be restricted sufficiently. This construction provides the further advantage of restricting such reverse effect as the background dots formed for the purpose of eliminating blanks in the peripheries of the target dots might actually increase the density of the area of the target dot, thus hampering accurate density determination thereof.

According to a further aspect of the present invention, there is proposed a testing dot pattern to be obtained by exposure on the print paper for comparing the light emission amounts of the respective luminous elements of the exposing head described in claim 1, which testing dot pattern comprises: target dots formed on the punt paper by driving luminous elements selected as target elements which are not adjacent each other in the main scanning direction; and background dots formed in the peripheries of the respective target dots, the background dots having a density above a predetermined value.

Preferably, the relative light emission amounts of the respective luminous elements are obtained by determining the densities of the target dots by using a scanner; and the testing dot pattern further includes position-index dots for providing position information of the target dots to the scanner.

With the above construction, the print paper bearing the image of the testing dot pattern developed by a developing operation will be set on e.g. a flatbed scanner to be scanned thereby. With this one-step operation alone, the line scanner incorporated in the flatbed scanner may calculate the position of each target dot within the testing dot pattern based on the corresponding position information and may determine its density automatically.

More specifically, the position-index dots may include main-scanning index dots relating to position information respecting the main scanning direction and sub-scanning index dots relating to position information respecting the sub scanning direction; and the main-scanning index dots may include odd-pixel main-scanning index dots formed by luminous elements for odd-numbered pixels and even-pixel main scanning index dots formed by other luminous elements for even-numbered pixels.

Further and other objects, features and advantages of the invention will become apparent from the following detailed description of the preferred embodiments thereof with reference to the accompanying drawings.

DESCRIPTION OF THE PREFERRED EMBODIMENTS

One preferred embodiment of the invention will be described in details with reference to the accompanying drawings.

(Construction of Vacuum Fluorescent Print Head)

Figure 1:
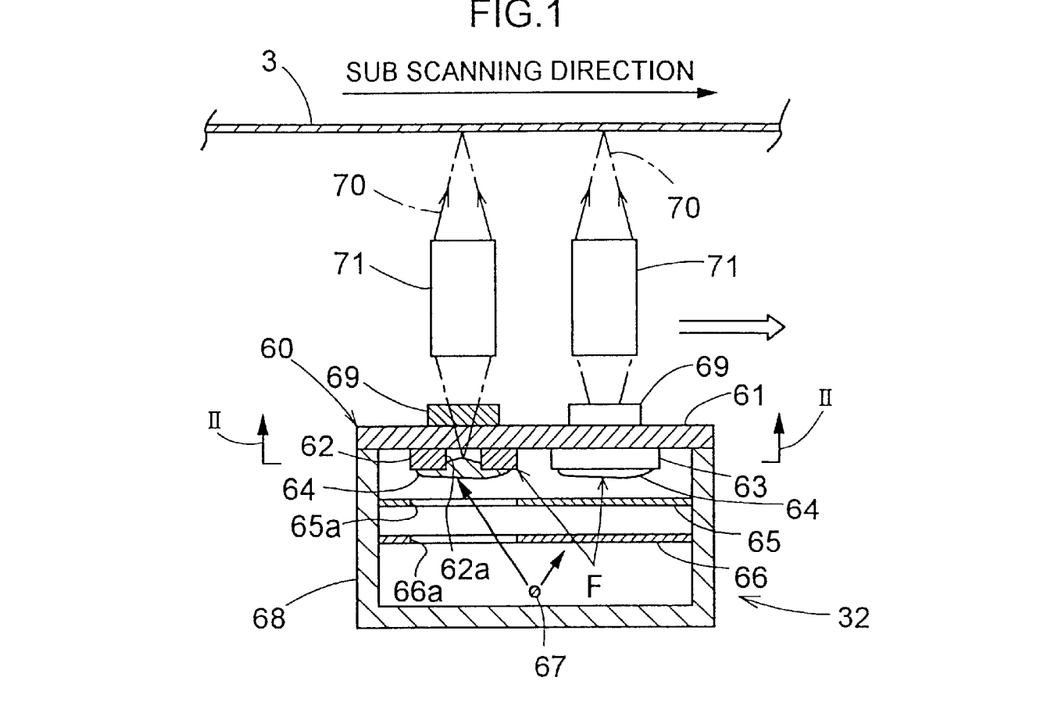
FIG. 1 is a schematic section showing an example of a print head of a fluorescent printer.

FIG. 1 is a schematic section showing a vacuum fluorescent print head 60 for color printing. The vacuum fluorescent print head 60 actually includes three luminous blocks 32, 33, 34 (see FIG. 4) for R (red), G (green), and B (blue) components respectively. However, only the R block 32 is shown in FIG. 1. The other G and B blocks are substantially identical in construction to the R block 32.

The luminous block 32 includes a substrate 61 made of a translucent material, on an inner surface of which there are provided a first strip-like anode conductor 62 and second strip-like anode conductor 63 both of which are made of aluminum thin film. As may be best understood from FIG.

Figure 2:
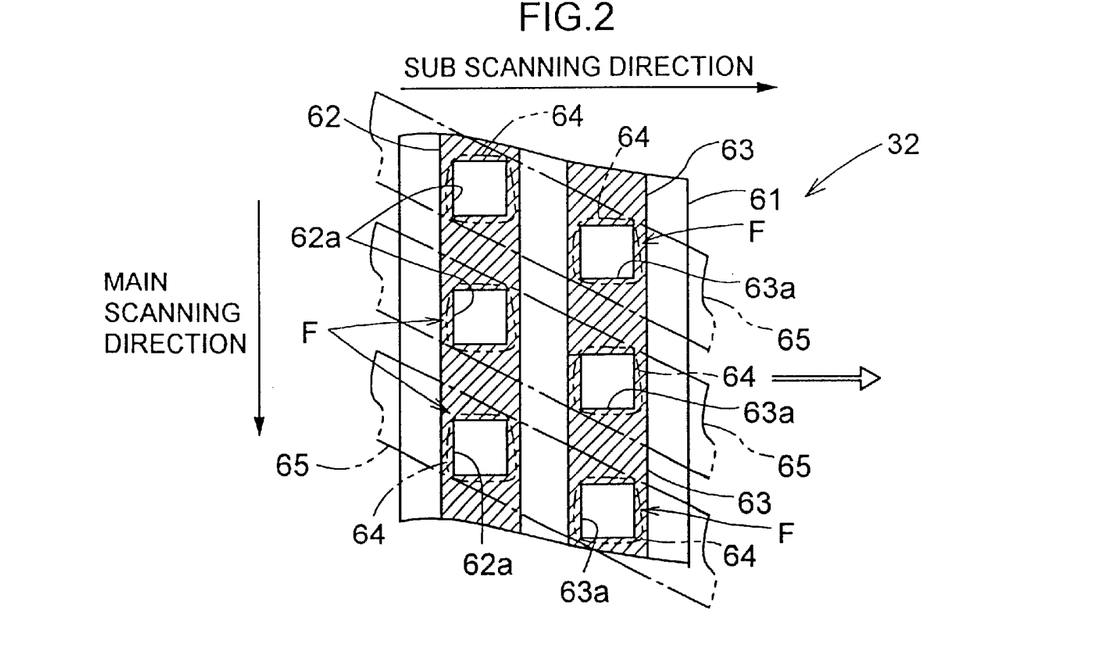
FIG. 2 is an enlarged plan view as seen from a direction of arrow II in FIG. 1, FIG. 3 schematic perspective view showing the print head.

2, these strip-like anode conductors 62, 63 extend along a main scanning direction which is perpendicular to a transporting direction of a photosensitive material 3 (referred to as a "print paper hereinafter") to be exposed by this print head 60. Further, each conductor 62, 63 includes a number of rectangular through-holes 62a, 63a formed with a predetermined pitch therebetween. And the through-holes 62a of the first strip-like anode conductor 62 and the through-holes 63a of the second strip-like anode conductor 63 are offset from each other by half pitch in the main scanning direction, so that the holes are arranged in two arrays in a zigzag pattern in the main scanning direction.

Each of the through-holes 62a, 63a is covered with a phosphor 64 containing Zn:ZnO as the main component thereof. Spaced apart from and in correspondence with the respective phosphors 64, a plurality of grid electrodes 65 are provided to traverse the main scanning direction, each grid electrode 65 defining a slit 65a, as a translucent portion, in an area thereof opposing the phosphor 64. The respective grid electrodes 65 are electrically independent of each other to be impinged with control voltages independent of each other. Farther apart from the grid electrodes 65, there is provided an accelerating electrode 66 which comprises a single metal plate defining a plurality of slits 66a in correspondence respectively with the slits 65a of the grid electrodes 65. A common accelerating voltage is impinged on this accelerating electrode 66. Still farther apart from the grid electrodes 65, there is provided a filamentary cathode electrode 67 along the main scanning direction.

The phosphor 64, the grid electrode 65, the first strip-like anode conductor 62 or second strip-like anode conductor 63, and the accelerating electrode 66, together constitute each fluorescent element F (an example of luminous element), so that a light beam emitted from each luminous element F forms one-dot latent image on a print paper 3.

And, as will be described later, the luminous elements F of the first strip-like anode conductor 62 provide odd pixels of the vacuum fluorescent print head (i.e. the odd-numbered pixels as numbered from the upper end of the head), whereas the luminous elements F of the second strip-like anode conductor 63 provide even pixels of the print head (i.e. the even-numbered pixels as numbered from the upper end of the head).

The above-described components, i.e. the strip-like anode conductors 62, 63, grid electrodes 65, accelerating electrode 66, and the cathode electrodes 67 are together accommodated with a vacuum space formed by the inner face of the substrate 61 and a cover 68. On the outer face of the substrate 61, there are attached red color filters 69, as an example of color filter, in opposition to the respective phosphors 64. Then, light beams 70 emitted from the phosphors 64 are modulated through these red color filters 69 and then converged through SELFOC lenses 71 to form a latent image on the print paper 3.

In operation, with the cathode electrode 67 and the accelerating electrode 66 being impinged with predetermined voltages, a voltage is impinged alternatively on the first strip-like anode conductor 62 and the second strip-like anode conductor 63 by a predetermined timing and a positive exposure signal is applied to a predetermined grid electrode 65 in synchronism with this timing, whereby thermion emitted from the cathode electrode 67 is caused to travel through the slit 65a depending on the condition of its grid electrode 65 and to eventually impinge the phosphor 64. Upon impingement with this thermion, the excited phosphor 64 emits a light beam 70, which is caused to travel through the through hole to reach the print paper 3 to effect one light beam dot amount of exposure on this paper 3.

The light emitting characteristics of each luminous element F may vary, due to e.g. the light-emitting area, inter-electrode distance, and so on of the element. Then, in order to allow the respective elements F to provide a uniform amount of light beam when driven under a same driving condition, the control signal applied to each grid electrode 65 is adjusted based on a reference light emission amount value which is obtained in advance through measurements of the elements driven under a certain identical driving condition. With this adjustment, the amounts of light beams emitted from the respective luminous elements F may be rendered uniform.

The actual light emission amount (light amount before adjustment) required for the above-described adjustment may be obtained by a method of testing a light emission condition according to this invention. Further, the invention's method is utilized also for obtaining the light emission amount (the light emission amount rendered uniform after the adjustment) of each luminous element F when the print head is driven by providing the adjusted control signal to the grid electrode 65.

(Reciprocating Mechanism For Vacuum Fluorescent Print Head)

Figure 3:
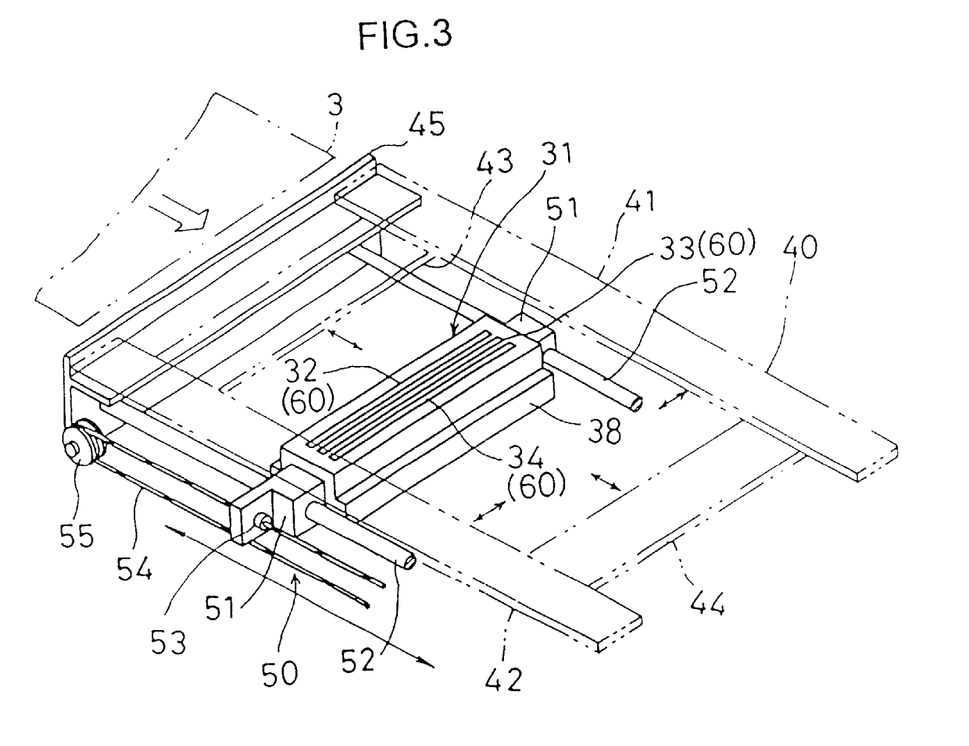
Figure 10:
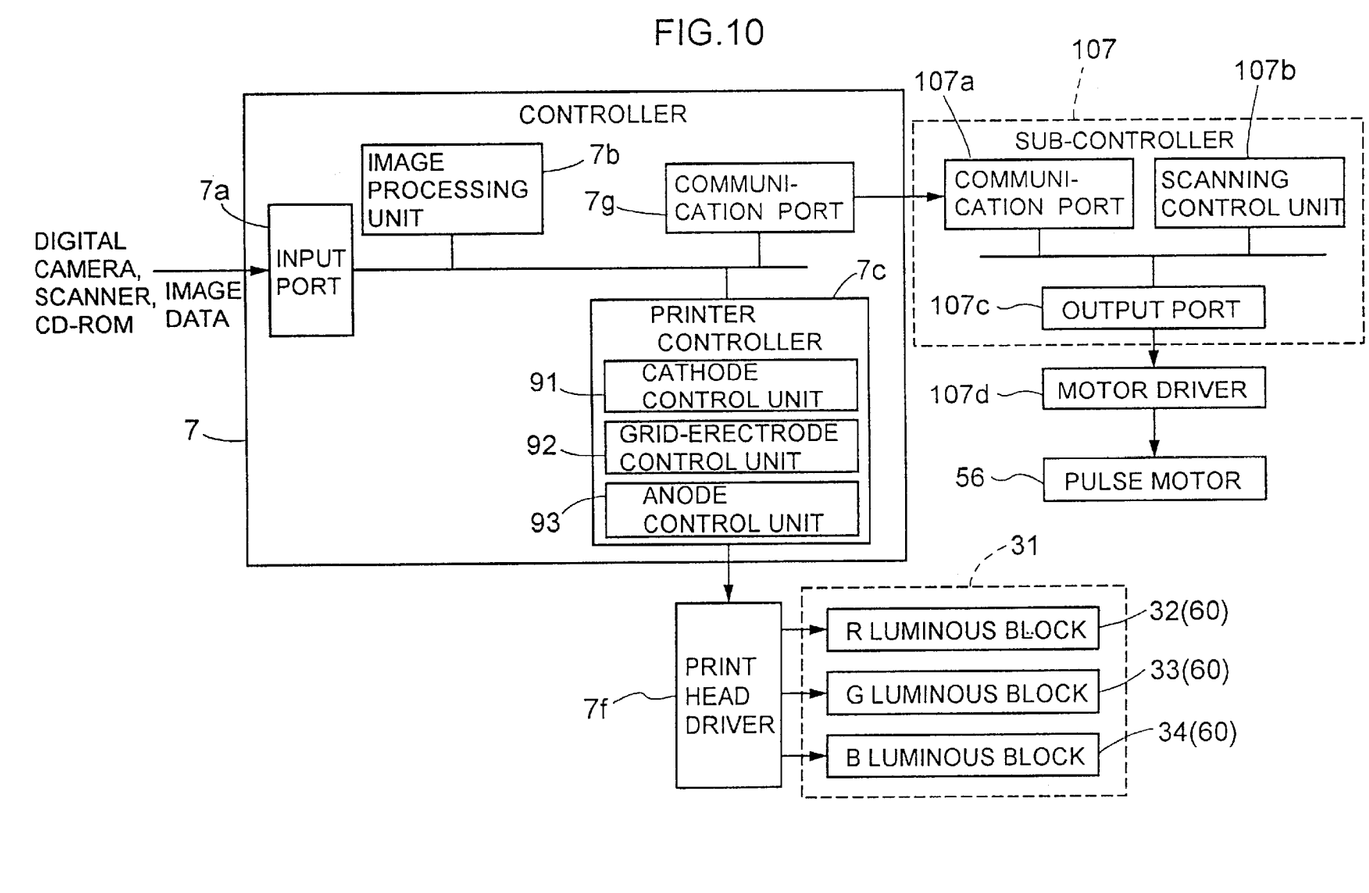

As shown in FIG. 3 in details, a vacuum fluorescent printer 30 includes the print head 60 having the R block 32 having the above-described construction, G block 33 and the B block 34 and also includes a reciprocating mechanism 50 for transporting this print head 60 to scan the print paper 3 along its transporting direction. As shown in FIG. 10, the respective luminous blocks 32, 33, 34 of the print head 60 are connected with a controller 7, and a driver of the reciprocating mechanism 50 is connected to a sub-controller 107. In operation, with the light emission control of the luminous elements F by the controller 7 and the scanning control of the print head 60 via the reciprocating mechanism 50 by the sub-controller 107 in the sub scanning direction, image data and/or character data are color-exposed on the print head 3.

Figure 4:
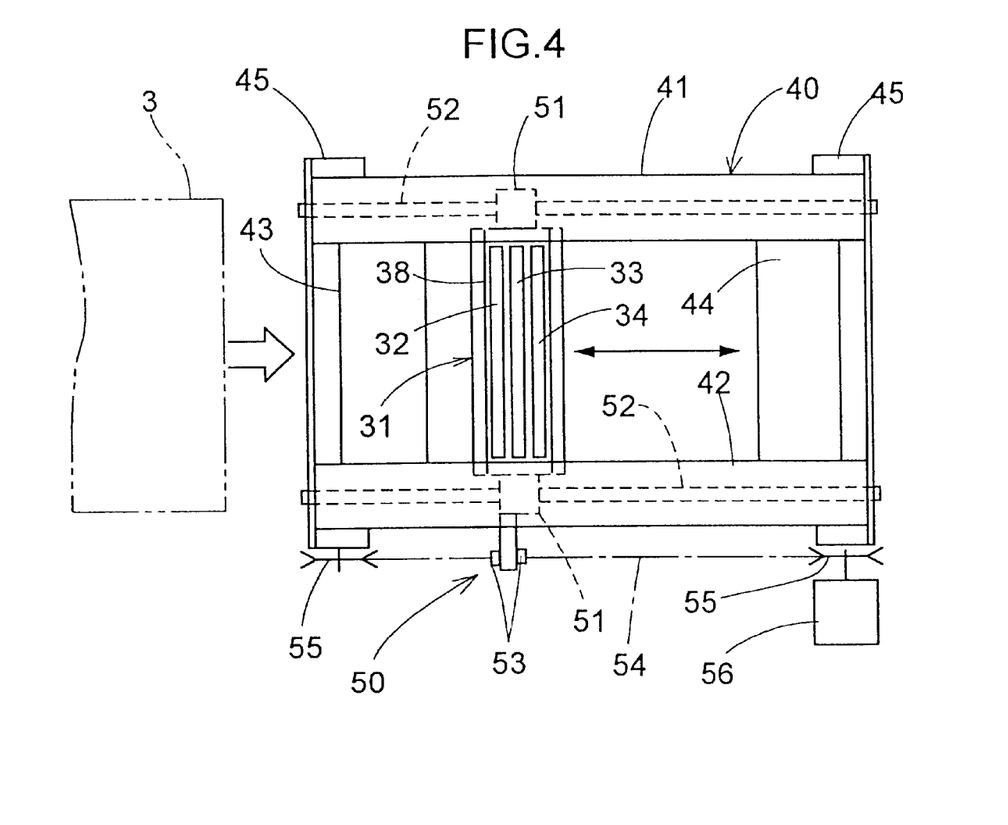
FIG. 4 is schematic plan view showing a paper mask and a reciprocating mechanism for the print head.
Figure 5:
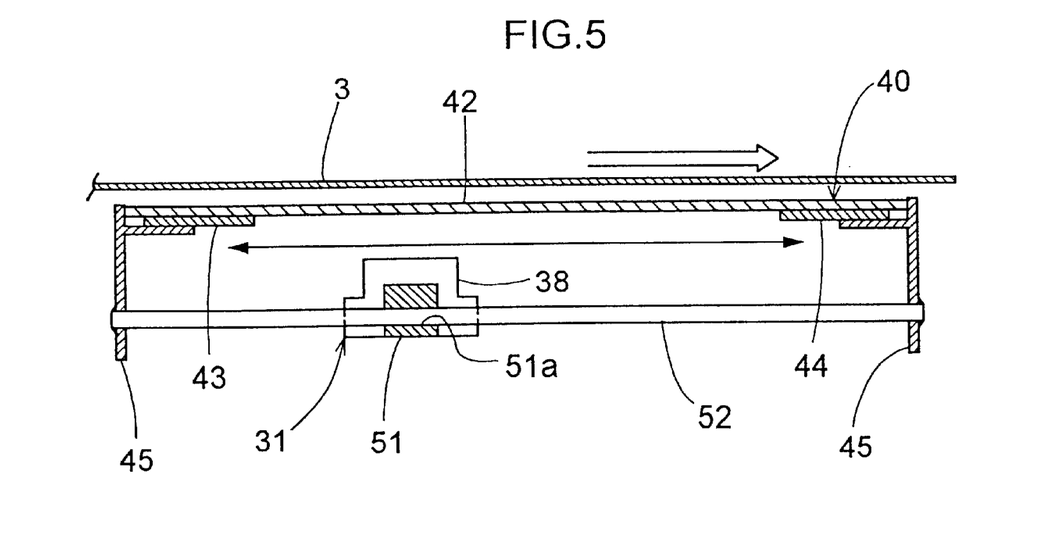
FIG. 5 is a schematic plan side view showing the paper mask and the reciprocating mechanism for the print head.

As schematically shown in FIGS. 4 and 5, a paper mask 40 includes an upper-side member 41 and a lower-side member 42 which extend parallel with the transporting direction of the print paper 3 and can be moved back and forth in the direction transverse to the transporting direction, a left-side member 43 and a right-side member 44 which extend in the direction transverse to the transporting direction and can be moved back and forth in this transporting direction, and a base frame 45 supporting these upper, lower and side members 41, 42, 43, 44. The distance between the upper-side member 41 and the lower-side member 42 determines the width of the exposure area of the print paper 3, whereas the distance between the left-side member 43 and the right-side member 44 determines the length of the exposure area. The movements of the upper and lower side members 41, 42 and of the left and right side members 43, 44 are controlled by the controller 7 via an unillustrated drive mechanism.

The reciprocating mechanism 50 for the vacuum fluorescent print head 60 is mounted on the base frame 45 of the paper mask 40. This mechanism 50 includes, as major components thereof, a pair of guide members 51 provided at opposed lateral ends of the print head 60, a corresponding pair of guide rails 52 which are inserted respectively in guide holes 51a formed in the guide members 51, a pair of sprockets 55 arranged at the opposed ends of the base frame 45, a wire 54 entrained between the pair of sprockets 55, and a pulse motor 56 for rotatably driving the one sprocket 55 forwardly or reversely under the control of the sub-controller 107. The opposed ends of the wire 54 are secured to the one guide member 51 by means of a wire retainer 53. With the rotation of the pulse motor 56, the wire 54 is driven to move the print head 60 along the guide rails 52.

As described hereinbefore, the luminous elements F of the vacuum florescent print head 60 are arranged in two arrays. However, in the case of a normal exposure operation for reproducing image information as a two-dimensional image on the print paper, even when all of the odd-numbered and even-numbered phosphors 64 emit respective beams for example, as the print head 60 and the print paper 3 are moved relative to each other in synchronism with a difference between the beam emitting timing of the odd-numbered phosphors 64 and that of the even-numbered phosphors 64, the light emission from the odd-numbered phosphors 64 and the light emission from the even-numbered phosphors 64 are effected at positions on the print paper 3 completely aligned with respect to the sub scanning direction, so that one array of dots, rather than two arrays of the same, will be exposed on the print paper 3.

(Testing Method of Light Emission Condition)

Next, by way of the example of the color-printing vacuum fluorescent color-printing print head 60 described above, a method of testing light emission condition of the vacuum fluorescent print head relating to one preferred embodiment of the present invention will be described.

Figure 6:
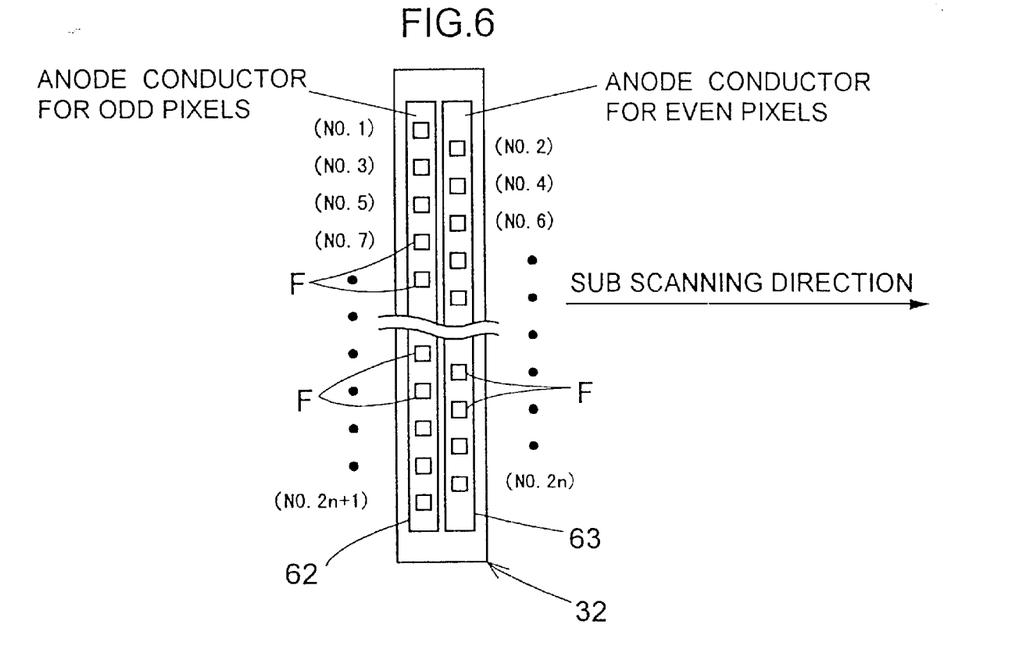
FIG. 6 is a schematic plan view showing one of luminous blocks of the print head.

FIG. 6 is a schematic plan view showing the entire R (red) luminous block 32 of the print head 60. As the other two G (green) and B (blue) luminous blocks 33, 34 have the substantially identical construction, the entirely identical method can be applied to these other blocks 33, 34 as well.

As described herein before, the luminous block 32 has the first and second strip-like anode conductors 62, 63 extending along the main scanning direction, and the luminous elements F provided to the first strip-like anode conductor 62 provide the odd pixel components of the print head and the elements F of the second strip-like anode conductor 63 provide the even pixel components of the same.

Then, for testing the light emission condition of the print head 60, if all of the odd pixels by the luminous elements F of the first strip-like anode conductor 62 and all of the even pixels by the elements F of the second conductor 63 are exposed at positions on the print paper 3 completely aligned with respect to the sub scanning direction like the case of the normal exposure operation based on image information described hereinbefore, then, as shown in FIG. 14a, there is formed a single array-like dot pattern Dp1 including dots which are not spaced apart from each other in the sub scanning direction. When this dot pattern Dp1 is viewed in an enlarged scale, as shown in FIG. 14b, there may be seen partial overlaps between the respective adjacent dots in the outer-most regions thereof in the main scanning direction (for instance, the No. 2 dot D is overlapped at the upper end lower ends thereof with the No. 1 dot D and No. 3 dot D, respectively). Therefore, when the density of each dot D is to be read by means of a scanner or the like to check the light emission condition of each luminous element, the scanner or the like will read also the portion of the other adjacent (in this case vertically adjacent) dot D, thus making it difficult to grasp accurately the light emission condition of each luminous element F as the condition is influenced by the other adjacent dots (in this particular case, the upper and lower adjacent dots).

Then, in view of the above-described problem, in the case of the method of testing light emission condition of a vacuum fluorescent print head according to the present invention, first, a special testing dot pattern is formed in the print paper by causing the luminous elements F of the exposing head to emit beams under a predetermined condition. Next, after developing this print paper, the developed testing dot pattern is read by the scanner so as to grasp the light emission characteristics of each luminous element F.

And, as the testing dot pattern described above, the invention employs a pattern in which the dots D obtained by the luminous elements F selected as testing target elements are spaced apart from each other in both the main and sub scanning directions of the exposing head 60 and also the peripheries of the test target dots D are completely 'filed' with a predetermined density without leaving any blanks therein. This 'filling' operation is provided for the purpose of restricting the possible disturbance due to the flare-like interference of the irradiating beam emitted from the optical reflection type scanner.

Specifically, the light emission condition testing method above is carried out in accordance with first through fourth steps described next.

(First Step)

In this step, some luminous elements which are selected as test target elements and disposed not adjacent each other in the main scanning direction are driven to form latent images of the target dots on the print paper 3. More particularly, as shown in FIG. 7, this first step consists of a first sub step of forming a latent image of a first dot array Do (consisting of the dots No. 1, 3, . . . indicated by diagonal hatching) by driving at one time those luminous elements F of the exposing head 60 (in this particular case, the R luminous block 32) assigned for odd-numbered pixels; and a second sub step of forming a latent image of a second dot array De (consisting of the dots No. 2, 4, . . . indicated by diagonal hatching) by driving at one time further luminous elements F of the exposing head assigned for even-numbered pixels at a position spaced (e.g. by one dot amount) from the latent image of the first dot array Do in the sub scanning direction.

With this first step, the latent images of the target dots (the dots No. 1, 2, 3. . . in FIG. 7) obtained by the all luminous elements F on the exposing head 60 are exposed in such manner that all of the dots are spaced from one another in the main scanning direction as well as in the sub scanning direction (by one dot amount in the case of the instant embodiment). These exposed latent images together provide a testing dot pattern consisting of the two arrays, i.e. the first array of the odd-numbered dots Do and the second array of the even-numbered dots De, with the dots of the arrays being arranged in a "zigzag" pattern. Consequently, in the density determination of the target dot in the subsequent third step, the determination may be made without influence from the most adjacent other dot, so that the determination may be made with accuracy.

(Second Step)

Figure 7:
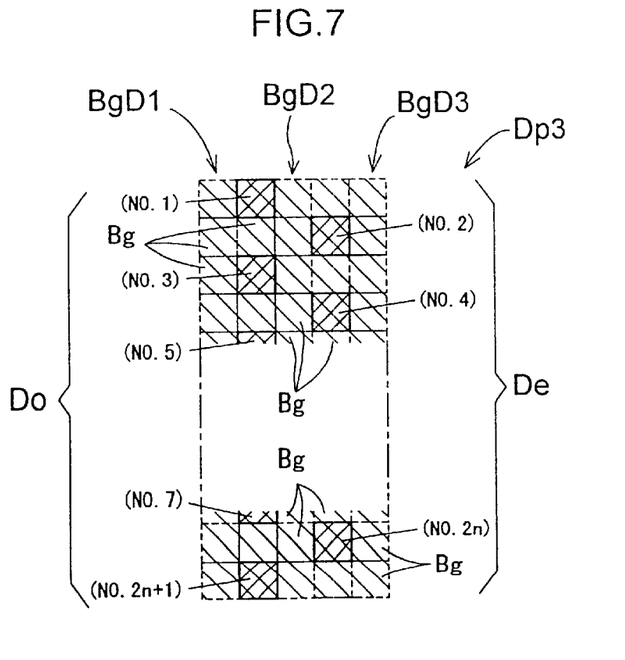
FIG. 7 is an explanatory view illustrating a testing dot pattern according to embodiment of the present invention, FIG. 8 a schematic view illustrating a step of reading the dots.

As shown in FIG. 7, so as to fill the periphery of each test target dot Do, De with a density above a predetermined value without leaving any blanks therein, latent images of background dots Dg (dot indicated by rightward lowering oblique lines) are formed in the periphery of each target dot Do, De. This is done for the purpose of restricting the possible disturbance due to the flare-like interference of the irradiating beam emitted from the optical reflecting scanner.

In this embodiment, the step of forming the target dots Do, De is referred to as the first step; and the step of forming the background dots Bg is referred to as the second step. In the actual process of forming these dots, however, the formation of the background dots Bg is not effected after completion of the formation of the target dots Do, De. Rather, this operation is effected in the following manner.

First, prior to the first sub step of the first step for forming the latent image of the first dot array Do, Do, . . . , all the luminous elements F are driven to form the latent image of a first background dot array BgD1, so as to fill the 'upstream' (i.e. in the sub scanning direction) blank area of the first dot array Do, Do, . . .

Next, simultaneously with the first sub step of forming the latent image of the first dot array Do, Do, . . . , all of the even-pixel luminous elements F too (i.e. together with all of the odd-pixel elements) are driven for light emission with intensity above a predetermined value so as to fill the inter-dot gaps (i.e. gaps between the adjacent dots in the main scanning direction) between the dots of the this first dot array Do, Do, . . .

In succession, in the same manner as the first background dot array BgD1 described above, all of the luminous elements F including both the odd and even pixel elements are driven for light emission with intensity above the predetermined value so as to completely fill the 'downstream' blank area of the first dot array Do, Do, . . .

Further, simultaneously with the second sub step of forming the latent image of the second dot array De, De, . . . , all of the odd-pixel luminous elements F too (i.e. together with all of the even-pixel elements) are driven for light emission with intensity above the predetermined value so as to fill the inter-dot gaps (i.e. gaps between the adjacent dots in the main scanning direction) between the dots of the this second dot array De, De, . . .

Lastly, in the same manner as the first background dot array BgD1, all of the luminous elements F including both the odd and even pixel elements are simultaneously driven for light emission with the intensity above the predetermined value, so as to form a latent image of a third background dot array BgD3 for filling the 'downstream' blank area of the second dot array De, De, . . .

Incidentally, the light emission intensity of the luminous elements F for forming the latent images of the target dots Do, De should be such that the density of the target dots Do, De when developed is as high as possible (in general, because the ultimate purpose of this test is to render the emission intensities of all the luminous elements F uniform, the intensity will actually be adjusted to the dot density of the luminous element F having the lowest emission capability under a certain fixed condition). And, the emission intensity of the luminous elements F for forming the latent images of the background dots Bg should be set such that the density of the background dot Bg when developed be about 50 to 60% of the density of the developed target dot Do, De. This will minimize the possibility of leaving any completely blank region between the background dot Bg and the target dot Do, De and the further possibility of 'apparent' increase in the density of the target dot Do, De due to partial invasion of the background dot Bg into the area of the target dot Do, De. Consequently, this will further help accurate reading of the density of the target dots Do, De.

(Third Step)

Subsequently to the first and second steps above, the print paper is subjected to a developing process, so that there is formed a developed image of a testing dot pattern Dp3 shown in FIG. 7 consisting of the developed images of the target dots Do, De and the background dots Bg obtained in the first and second steps above. Next, as conceptually illustrated in FIG. 8, of this developed testing dot pattern Dp3, the densities of the target dots Do, De alone are determined by scanning a line scanner 80 in the direction normal to the respective arrays of the target dots Do, De. Preferably, the line scanner 80 mounts at least the same number of CCD as the luminous elements F mounted on the exposing head 60, with the CCD's being juxtaposed in the same direction as the respective arrays of the target dots Do, De.

Figure 8:
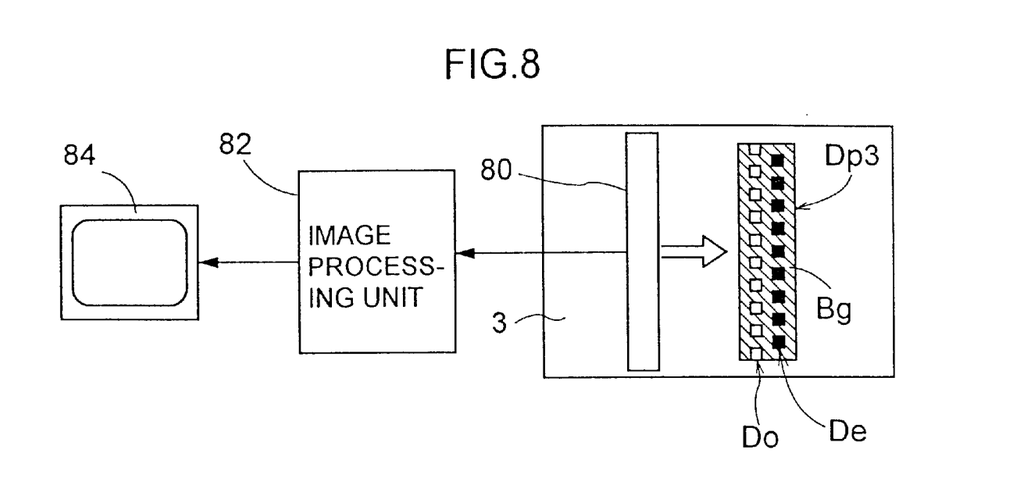

Specifically, in a typical case, the line scanner 80 will determine the densities of the first dot array Do, Do . . . (odd-numbered dots) and then transmit the resultant density signals to an image processing unit 82. Thereafter and in succession thereto, the line scanner 80 will determine the densities of the second dot array Do, De . . . (even-numbered dots) and transmit the resultant density signals to the image processing unit 82.

(Fourth Step)

Figure 9:
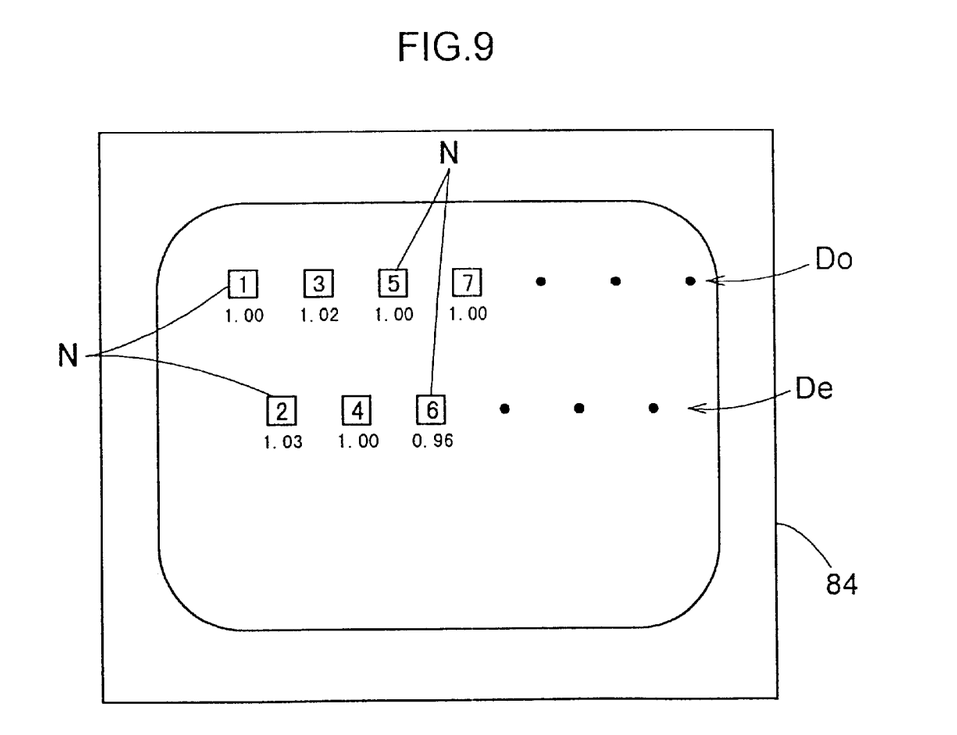
FIG. 9 is a view showing an example of a test result of light emission condition as being outputted and displayed on a monitor screen, FIG. 10 a schematic block diagram of exposure control by the print head, FIG. 11 an explanatory view illustrating a testing dot pattern according to her embodiment of the present invention.

In this step, the image processing unit 82 effects conversion of each of the density signals obtained by the measurements in the third step for the target dots Do, De respectively into a numeric value such as a ratio relative to a predetermined reference value. Then, these numeric values are displayed on the screen of a monitor 84 as light emission amounts of the respective luminous elements F selected as the test target elements. In the case of a typical display scheme shown on the monitor 84 screen shown in FIG. 9, the numeric values indicative of the density values of the respective odd-numbered dot Do are shown horizontally together with symbols N (in the figure, each symbol N comprises a numeral such as 1, 3, 5 shown within a square) indicative of the serial number of each dot numbered from the terminal end of the exposing head 60; and downwardly thereof and horizontally together with the symbols N, there are shown the numeric values indicative of the densities of the respective even-numbered dots De together and in correspondence with the same symbols N indicative of the serial numbers of these dots numbered from the terminal end of the exposing head 60.

(Exposure Control of Print Paper by Vacuum Fluorescent Print Head)

FIG. 10 is a schematic block diagram schematically showing the system for controlling the exposure of the print paper 3 by the vacuum fluorescent print head 60. The controller 7 includes an image data input port 7a to be connected with an image read device to obtain digital image data from a digital camera, a scanner, a CD-ROM player and so on, an image processing unit 7b for image-processing inputted image data or bit-mapped character data for generating brightness bit data in the 8 bit format, i.e. 256 steps, and a printer controller 7c for setting driving conditions for the print head 60. The printer controller 7c includes a cathode control unit 91 for controlling the cathode voltage, a grid-electrode control unit 92 for controlling the grid voltage, and an anode control unit 93 for controlling the anode voltage.

The anode control unit 93 transmits to the print head driver 7f an impinging-voltage value suitable for the type of the print paper 3 to be printed. Accordingly, the first and second strip-like anode conductors 62, 63 of the respective luminous blocks may be impinged with suitable anode voltages best suited for the particular print paper 3 to be printed.

The grid-electrode control unit 92 transmits the image data obtained from the image processing unit 7b to the print head driver 7f. In this print head driver 7f, the brightness value of each color component is converted into a drive-pulse width and then transmitted to the grid electrode 65 of each R luminous block 32, G block 33 or B block 34.

The controller 7 also includes a communication port 7g connected to a communication port 107a of the sub-controller 107. The sub-controller 107 includes a scanning control unit 107b for generating control signals relating to the scanning speed and timing of the print head 60, so that the sub-controller 107, in cooperation with the controller 7, transmits the control signals to the pulse motor 56 via an output port 107c and a motor driver 107d. With this cooperation of the controller 7 and sub-controller 107, an image is printed by the vacuum fluorescent print head 60 at a predetermined position on the print paper 3.

Further Embodiment

By way of the example of the same color printing vacuum fluorescent print head 60 as in the foregoing embodiment, a further embodiment of the invention relating to a testing dot pattern for use in the above-described light emission condition testing method of the invention.

In this embodiment too, the conditions required by the testing dot pattern are the same as in the foregoing embodiment. Namely, in this testing dot pattern too, the target dots D to be formed by the individual luminous elements F selected as the target elements for testing their densities are not overlapped with each other in the main scanning direction of the exposing head 60 and the periphery of each of these target dots D is filled without blanks with the predetermined density.

Figure 11:
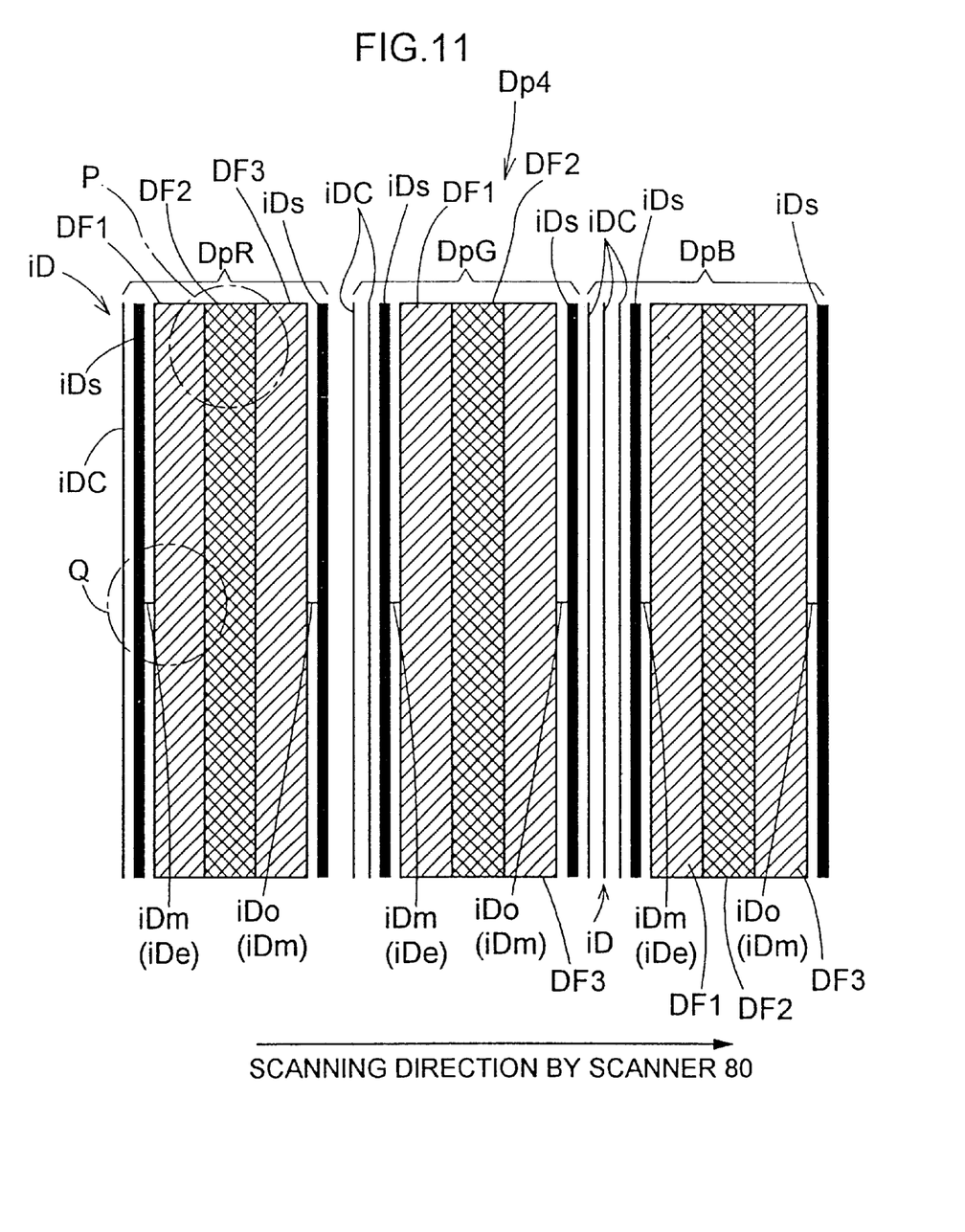

FIG. 11 shows an entire testing dot pattern Dp4 relating to this further embodiment. This testing dot pattern Dp4 consists of a red dot pattern DpR for testing the emission conditions of the luminous elements F mounted on the red luminous block 32, a green dot pattern DpG for testing the emission conditions of the luminous elements F mounted on the green luminous block 33, and a blue dot pattern DpB for testing the emission conditions of the luminous elements F mounted on the blue luminous block 34.

Figure 12:
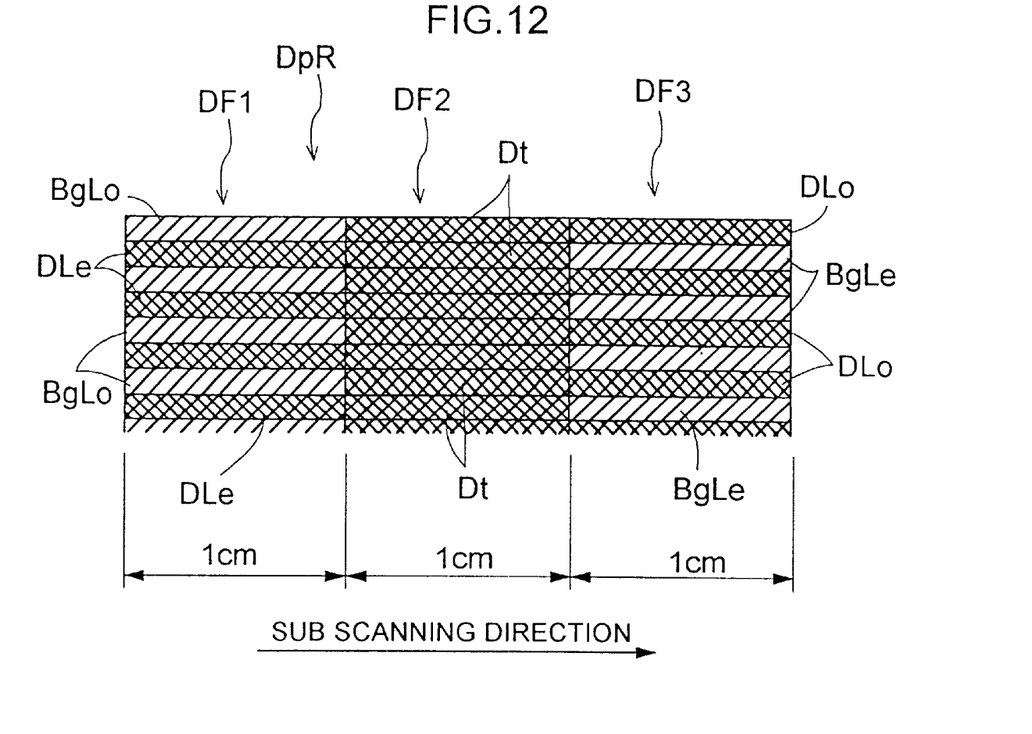
FIG. 12 is an enlarged view of principal portions in FIG. 11.

FIG. 12 is an enlarged view of the principal portions in the upper end of the red dot pattern DpR.

As represented by this FIG. 12, each of these testing dot patterns, i.e. the red dot pattern DpR, green dot pattern DpG and the blue dot pattern DpB includes a first dot face DF1, a second dot face DF2 and a third dot face DF3 juxtaposed to each other in the sub scanning direction. And, all of these first through third dot faces DF1, DF2 and DF3 extend about 1 cm in the sub scanning direction.

When the print paper is developed, the first through third dot faces DF1, DF2 and DF3 of the red dot pattern DpR are developed as cyan dots, based on the latent image formed by the red beam from the red luminous block 32. Similarly, the first through third dot faces DF1, DF2 and DF3 of the green dot pattern DpG are developed as magenta dots, based on the latent image formed by the green beam from the green luminous block 32; and the first through third dot faces DF1, DF2 and DF3 of the blue dot pattern DpB are developed as yellow dots, based on the latent image formed by the blue beam from the blue luminous block 32.

Now, the first through third dot faces DF1, DF2 and DF3 of the red dot pattern DpR will be referred to again. As shown in FIG. 12, the first dot face DF1 consists of high-density linear testing target dots DLe (the areas each indicated by crossing diagonal lines and consisting of a group of dots arranged in series in the sub scanning direction) which dots are formed by driving all of the even-numbered luminous elements F for light emission with a high density condition for testing while the print head 60 is being driven in the sub scanning direction, and linear background dots BgLo (the areas each indicated by the diagonal lines with left-hand lowering inclination and consisting of a group of dots arranged in series in the sub scanning direction) which dots are formed by driving all of the odd-numbered luminous elements F for light emission with a lower density condition which amounts to about 50 to 60% of the testing target dots simultaneously with the light emission of the even-numbered elements.

The second dot face DF2 consists solely of high-density transition dots Dt having a uniform density (indicated by crossing diagonal lines) formed by driving all of the luminous elements F (both the odd and even elements) for light emission with the same high density condition as that employed for the testing while the print head 60 is being driven in the sub scanning direction.

The third dot face DF3 consists of high-density linear target dots DLo (the areas each indicated by crossing diagonal lines and consisting of a group of dots arranged in series in the sub scanning direction) which dots are formed by driving all of the odd-numbered luminous elements F for light emission with the high density condition for testing while the print head 60 is being driven in the sub scanning direction and linear background dots BgLe (the areas each indicated by the diagonal lines with left-hand lowering inclination and consisting of a group of dots arranged in series in the sub scanning direction) which dots are formed by driving all of the even-numbered luminous elements F for light emission with the lower density condition which amounts to about 50 to 60% of that of the testing target dots simultaneously with the emission of the odd-numbered elements.

As described above, the linear testing target dots DLe, DLo of the first and third dot faces DF1, DF3 respectively extend about 1 cm in the sub scanning direction so as to help reading of the dots by the line scanner 80 in the density determining step. Further, each of the linear background dots BgLo, BgLe of the first and third dot faces DF1 and DF3 provides the function of completely filling the portion of the print paper in the vicinity around each linear testing target dot so as to restrict possible flare-like diffractive invasion of the beam from the line scanner 80 emitted for reading the density of the target dot. When the target dot pattern Dp2 is scanned by the line scanner 80 in the sub scanning direction, the second dot face DF2 provides the function of indicating to the scanner that the scanning area has left the first dot face DF1 including the even-pixel linear target dot DLe or the third dot face DF3 including the odd-pixel linear target dot DLo (when the scanning is effected along the sub scanning direction in the opposite direction to the direction indicated by arrow in FIG. 12).

Also, as shown in FIG. 11 also, each of the red dot pattern DpR, green dot pattern DpG and blue dot pattern DpB includes a position-index dot iD for providing position information of the target dot to the scanner in the subsequent determining step.

Figure 13:
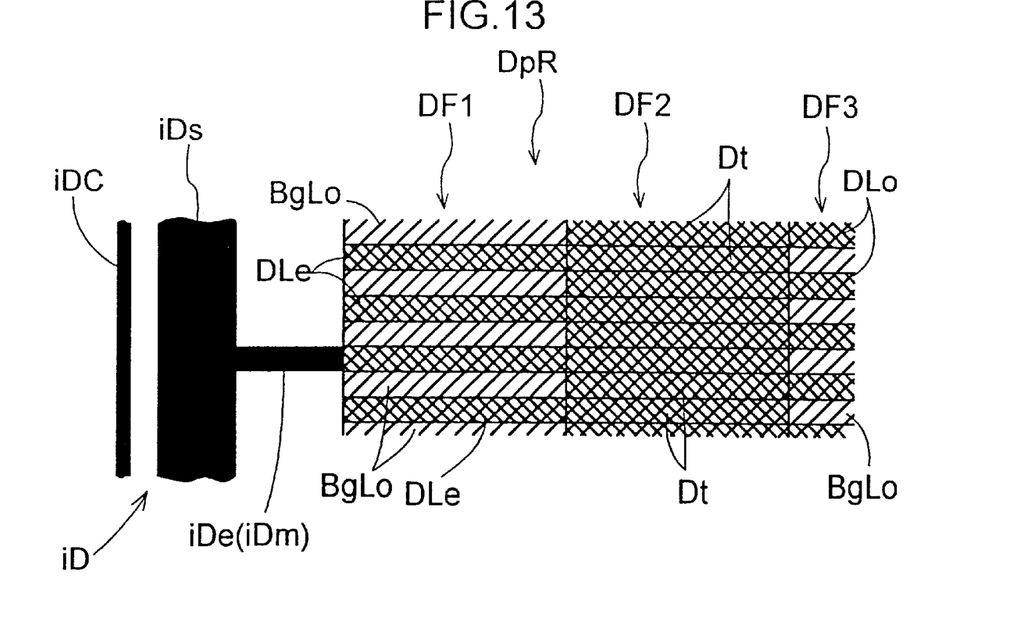
FIG. 13 is a further enlarged view of further principal portions in FIG. 11.

As representatively shown in FIG. 13 which shows the left-end portion of the R dot pattern DpR in an enlarged scale, the position-index dot iD includes a main-scanning index dot iDm relating to position information respecting the main scanning direction and a sub-scanning index dot iDs relating to position information respecting the sub scanning direction. The main-scanning index dot iDm shown in FIG. 13 is a main-scanning index dot iDe formed by the even-pixel luminous elements adjacent the even-pixel linear testing target dot DLe in the sub scanning direction. As shown in FIG. 11, however, at the position adjacent one dot of the even-pixel linear testing target dot DLo in the sub scanning direction, a main-scanning index dot iDo is formed by the odd-pixel luminous elements. All these main-scanning index dots iDm extend 2–3 mm in the sub scanning direction.

Further, on the upstream of the sub-scanning index dot iDs, there is provided a color-index dot iDC for defining to the scanner which of the R, G, B luminous blocks forms the dot pattern on the downstream. The color-index dot iDC indicative of the red dot pattern comprises a single black line; the color-index dot iDC indicative of the green dot pattern comprises two black lines; and the color-index dot iDC indicative of the blue dot pattern comprises three black lines, respectively.

Incidentally, each position-index dot iD including the main-scanning index dot iDm, the sub-scanning index dot ids and the color-index dot iDC is a black dot obtained by substantially uniform emissions of the respective luminous elements F corresponding to the red luminous block 32, the green luminous block 33 and the blue luminous block 34.

The invention has been described in connection particular embodiments thereof with the accompanying drawings. It should be noted however, the invention is not to be limited to the specific constructions described in the disclosed embodiments or shown in the drawings, as various modifications thereof will be apparent for one skilled in the art without departing from the essential spirit of the present invention which is defined by the appended claims for a patent application.

What is claimed is:

1. A method of testing a light emission condition of an exposing head of a type including a plurality of luminous element arranged along a main scanning direction for forming a linear dot pattern on a print paper, the exposing head being movable relative to the print paper in a sub scanning direction, the method comparing emission amounts of the respective luminous elements relative to each other based on the absolute densities of respective dots obtained by exposure on the print paper, the method comprising the steps of:

(1) a first step of forming latent images of testing target dots on the print paper by driving luminous elements selected as target elements which are not adjacent each other in the main scanning direction;

(2) a second step of forming latent images of background dots in the peripheries of the latent images of the target dots so that the peripheries are completely filled with the latent images of the background dots with a density above a predetermined value;

(3) a third step of developing the latent images of the target dots and the background dots formed on the print paper and subsequently determining the absolute densities of the respective developed images of the target dots by using a scanner; and (4) a fourth step of outputting the absolute density of each one of the target dots obtained by the third step as a light emission amount of each corresponding luminous element selected as one of the target elements;

wherein the developed background dots with a density above the predetermined value obtained by the second and third steps restrict a phenomenon of the determination of absolute densities by using the scanner being influenced by refection of an irradiating beam from the scanner in the peripheries of the target dots.

2. The method according to claim 1, wherein said first step includes the following sub steps:

a first sub step of forming a latent image of a first dot array by driving at one time those luminous elements of the exposing head assigned for odd-numbered pixels; and a second sub step of forming a latent image of a second dot array by driving at one time further luminous elements of the exposing head assigned for even-numbered pixels at a position spaced from the latent image of the first dot array in the sub scanning direction.

3. The method according to claim 1, wherein the background dot has density which amounts to 50 to 60% of that of the target dot.

4. A testing dot pattern for testing a light emission condition of an exposing head of a type including a plurality of luminous elements arranged along a main scanning direction for forming a linear dot pattern on a print paper, the exposing head being movable relative to the print paper in a sub scanning direction, the dot pattern being obtained by exposing on the print paper by the exposing head for comparing emission amounts of the respective luminous elements relative to each other, the testing dot pattern comprising:

target dots formed on the print paper by driving luminous elements selected as testing target elements which are not adjacent each other in the main scanning direction; and background dots formed in the peripheries of the respective target dots, the background dots having a density above a predetermined value.

5. The testing dot pattern according to claim 4 wherein the relative light emission amounts of the respective luminous elements are obtained by determining the densities of the target dots by using a scanner, and the testing dot pattern further includes position-index dots for providing position information of the target dots to the scanner.

6. The testing dot pattern according to claim 5, herein the position-index dots include main-scanning index dots relating to position information respecting the main scanning direction and sub-scanning index dots relating to position information respecting the sub scanning direction; and the main-scanning index dots include odd-pixel main scanning index dots formed by luminous elements for odd-numbered pixels and even-pixel main scanning index dots formed by other luminous elements for even-numbered pixels.

7. A testing dot pattern for testing a light emission condition of an exposing head of a type including a plurality of luminous elements arranged along a main scanning direction for forming a linear dot pattern on a print paper, the exposing head being movable relative to the print paper in a sub scanning direction, the dot pattern being obtained by exposing on the print paper by the exposing head for comparing emission amounts of the respective luminous elements relative to each other, the relative emission amounts of the luminous elements being obtained by determining the densities of the respective images of the target dots by using a scanner, the testing dot pattern comprising;

a first dot plane formed by driving all even-numbered luminous elements under a testing condition and including an array of target dots for even-numbered pixels continuously adjacent in the sub-scanning direction;

a third dot plane formed by driving all of said odd-numbered luminous elements under the testing condition and including an array of target dots for odd-numbered pixels continuously adjacent in the sub-scanning direction; and a second dot plane formed by driving all of the even-numbered and odd-numbered luminous elements under the testing condition between the first dot plane and the third dot plane, the second dot plane functioning as transition dots for causing the scanner to recognize that an area scanned by the scanner along the sub scanning direction has been displaced from the first dot plane or from the third dot plane.

8. The testing dot pattern according to claim 7, wherein said first dot plane includes background dots for filling the peripheries of the even-numbered target dots with dots of an intermediate density by driving all of the odd-numbered luminous elements;

said third dot plane includes background dots for filling the peripheries of the odd-numbered target dots with dots of an intermediate density by driving all of the even-numbered luminous elements; and the background dots restricted a phenomenon of the determination of absolutely densities by using the scanner in the peripheries of the target dots.

* * * * *